United States Patent

[11] 3,602,544

[72] Inventor John Marsh
 Trumbull, Conn.
[21] Appl. No. 794,904
[22] Filed Jan. 29, 1969
[45] Patented Aug. 31, 1971
[73] Assignee United Aircraft Corporation
 East Hartford, Conn.

[54] UNIVERSAL, HEAVY-DUTY SLING
 6 Claims, 7 Drawing Figs.
[52] U.S. Cl............................................... 294/74,
 212/82, 212/85, 294/78 A
[51] Int. Cl............................................... B66c 1/12
[50] Field of Search............................................... 294/74, 78,
 67 A, 78, 81, 81 SF, 75, 76, 67; 214/7; 212/45, 82;
 5/85, 89

[56] References Cited
UNITED STATES PATENTS
| | | | |
|---|---|---|---|
| 2,603,523 | 7/1952 | Cameron..................... | 294/74 |
| 3,021,166 | 2/1962 | Kempel et al................. | 294/74 |
| 3,360,293 | 12/1967 | Barthule...................... | 294/74 |

FOREIGN PATENTS
| | | | |
|---|---|---|---|
| 805,264 | 12/1958 | Great Britain............... | 294/74 |
| 579,380 | 6/1958 | Italy............................. | 294/74 |

*Primary Examiner*—Richard E. Aegerter
*Assistant Examiner*—Douglas D. Watts
*Attorneys*—Maurice B. Tasker and Vernon F. Hauschild ABSTRACT: An aerial recovery system for enabling a helicopter to transport a disabled aircraft has two slings, each having three separate bands, for cradling the disabled aircraft at spaced points along its fuselage. The bands of each sling are separately pivotally connected at each end side by side along the straight side of a D-shaped fitting through which a pin on the end of a spreader bar extends. A single hoisting band having its ends connected to the ends of the spreader bar passes through a self-locking, quick-adjusting assembly including three staggered drums which enables the helicopter hoist cable, which is hooked to this assembly, to be shifted freely fore and aft of the disabled aircraft when the hoist cable is slack to locate the assembly relative to the center of gravity of the aircraft and which locks the hoisting band in this position when the latter is placed under tension.

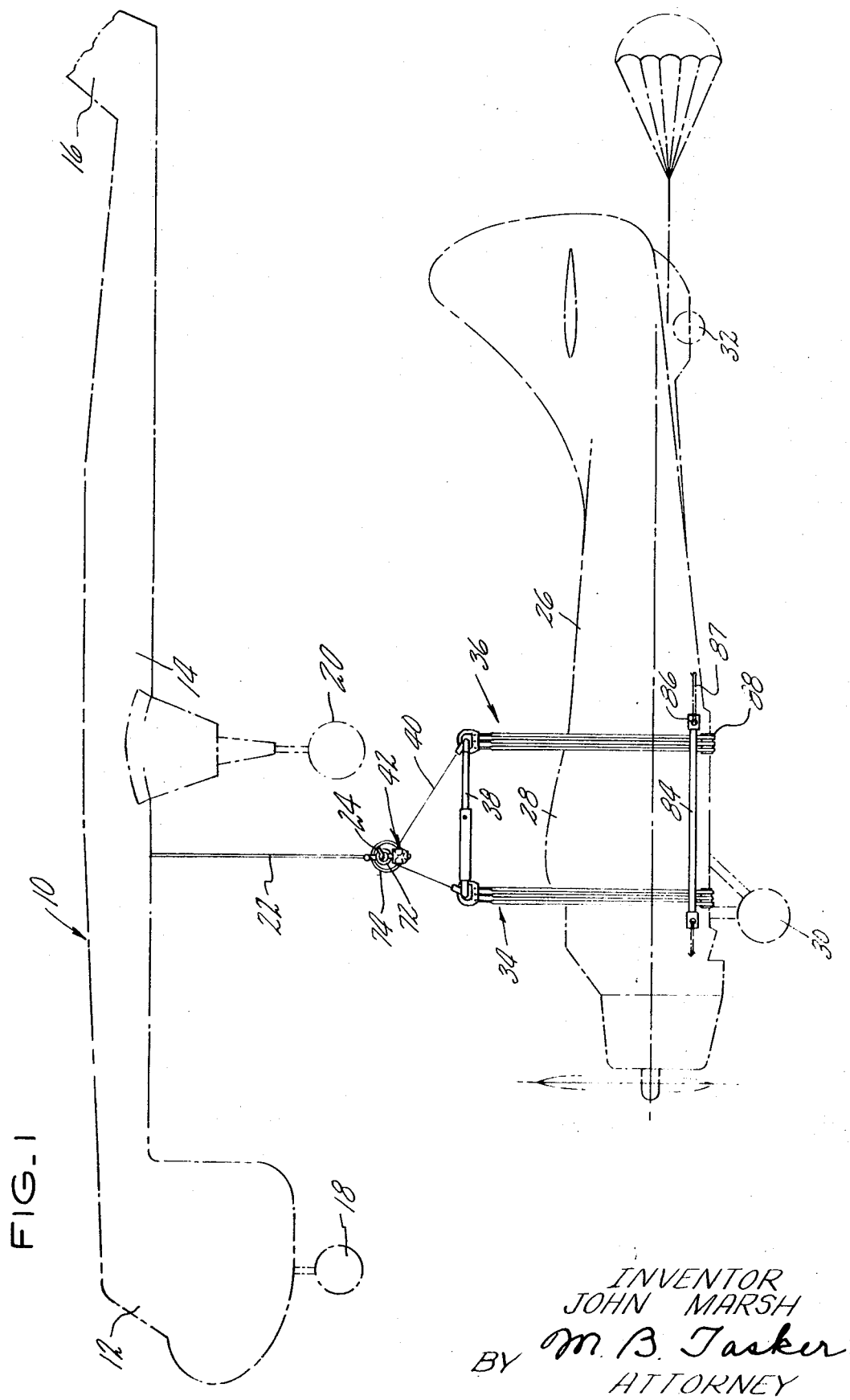

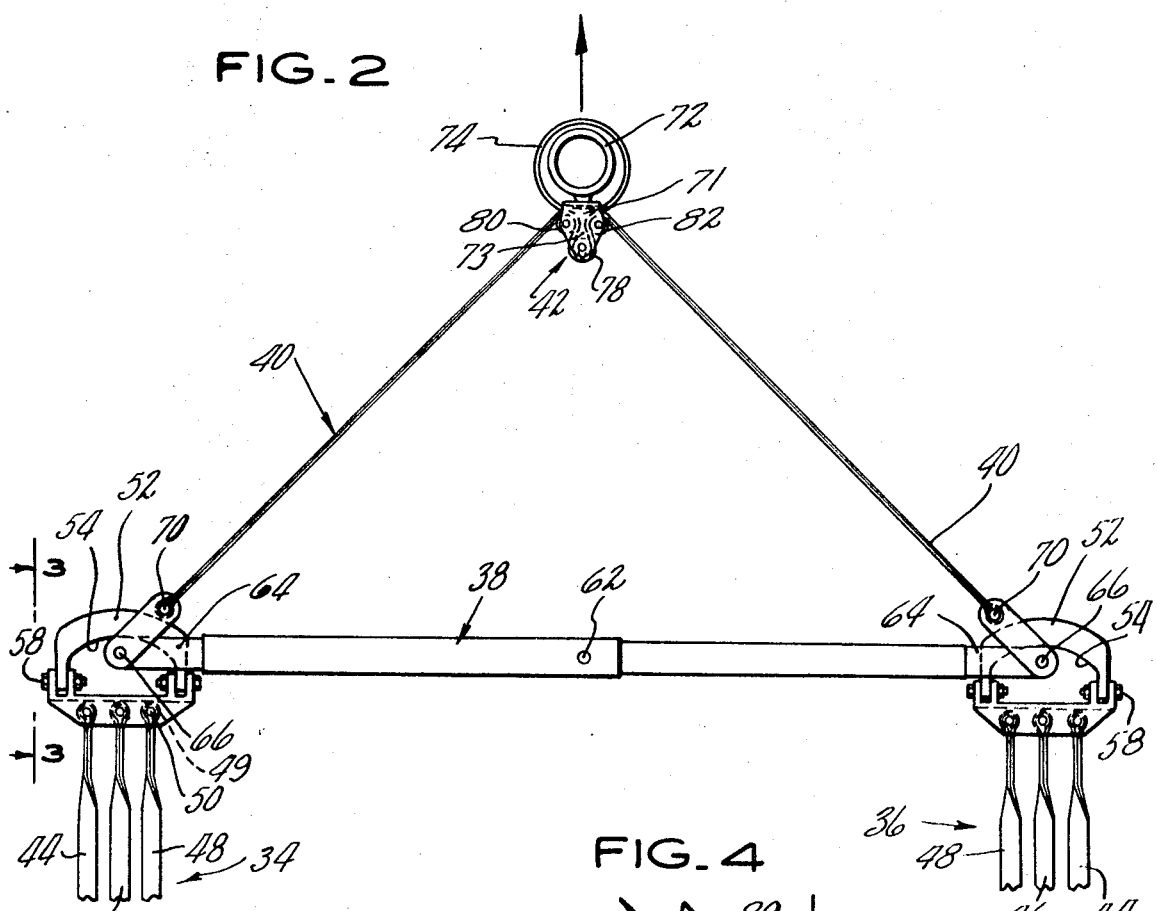

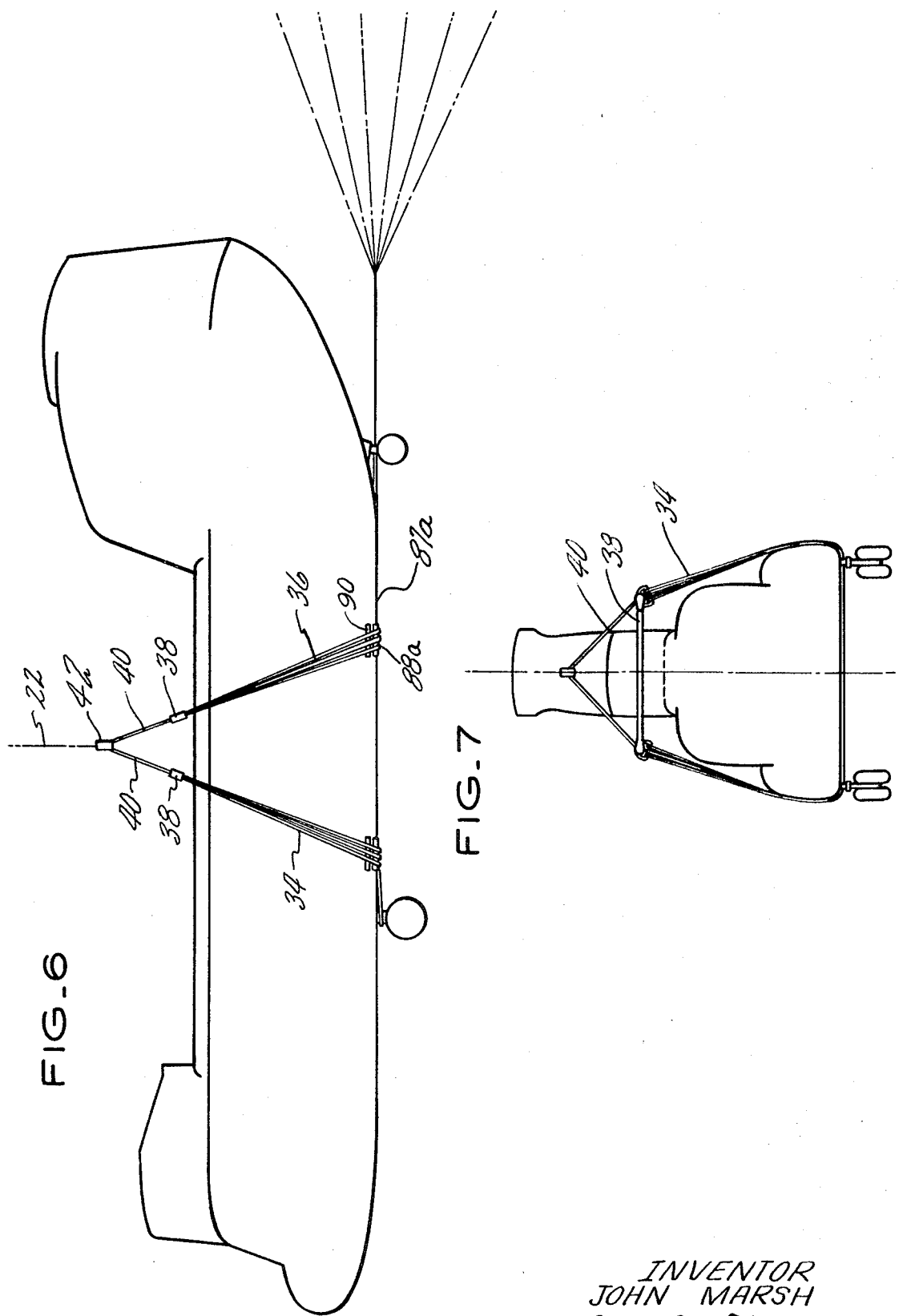

UNIVERSAL, HEAVY-DUTY SLING

The invention described herein was made in the course of or under a contract or subcontract thereunder with The Department of the U.S. Army.

BACKGROUND OF THE INVENTION

This invention relates to an aerial recovery system for enabling a helicopter to pick up and transport a disabled aircraft of any type within the load capacity of the helicopter without the need for special equipment designed to meet the requirements of each different aircraft.

Prior to this invention many specialized cables were provided for different aircraft which were attached to hardpoints on the aircraft—i.e. points of attachment from which the load is carried back into structural members of the airframe. Besides requiring many specialized cables, it frequently happened that one or more hardpoints on an aircraft were damaged or missing altogether. Furthermore these hardpoints, while adequate for lifting the aircraft were not strong enough to take flight loads imposed by present day high-speed recovery helicopters.

1. Field of the Invention

The present invention, by way of example, is well adapted for utilization with the cargo helicopter illustrated in U.S. Design Pat. No. 193,492, issued Aug. 28, 1962, to George Howard et al. to recover any disabled aircraft which is within the lifting capabilities of this helicopter.

2. Description of the Prior Art

A vehicle-hoisting arrangement of the type in use prior to the present invention is shown in U.S. Pat. No. 3,021,166, issued Feb. 13, 1962 to H. Kempel et al., in which a set of specialized lifting cables is shown for a particular vehicle during shiploading. No problem of maintaining a proper vehicle attitude is involved in this operation and no means is shown for making this adjustment.

Slings have also been used, but these have been open to the objection that they concentrated the load stresses on the cargo under certain conditions. This is particularly objectionable when dealing with disabled aircraft which are easily damaged during flight if stresses are not uniformly distributed over the sling engaging area. An example of a lifting sling of the prior art is shown in U.S. Pat. No. 2,960,365, issued Nov. 15, 1960, to H. Meisen. It will be evident that a sling of the type shown in Meisen can evenly distribute the lifting stresses only under one condition, namely when the lift is exactly vertical on the end fitting of the sling—a condition which is impossible to maintain under varying conditions of aerodynamic loading in flight.

SUMMARY OF THE INVENTION

The present invention is directed to an improved, heavy-duty, aerial recovery system for lifting and transporting a disabled aircraft which can be quickly and easily applied to any aircraft and which has means which distributes the lifting load more evenly, thus avoiding concentrations of stress which could damage the surface of the disabled aircraft.

In accordance with the present invention two loops, or slings, are provided for cradling the downed aircraft at two spaced points along its fuselage which can be quickly and easily applied. Each sling includes a plurality of bands, the ends of which are pivotally connected in side-by-side relationship to the straight side of a D-shaped fitting. A telescoping spreader bar is provided for suitably spacing the ends of the slings to which a hoist band is attached.

In accordance with further aspects of the present invention a load leveling device is provided on the hoist band for determining the attitude of the transported aircraft and for locking the system in the desired attitude during transport. This device includes a self-locking and quick-adjusting assembly, to which the hook of the hoist cable is attached, and means for enabling the assembly to be shifted fore and aft of the disabled aircraft to locate the hoist cable relative to the center of gravity of the disabled aircraft.

BRIEF DESCRIPTION OF THE DRAWINGS

FIG. 1 is a side elevation of a crane-type helicopter transporting a disabled aircraft by means of the improved universal sling assembly of this invention.

FIG. 2 is an enlarged view of the sling assembly showing the spreader bar and the self-locking, quick-adjusting means for locating the hoist cable relative to the center of gravity of the disabled aircraft, the lower part of the slings being broken away to facilitate illustration.

FIG. 3 is an enlarged view of one end of the spreader bar of FIG. 2.

FIG. 4 is a diagrammatic showing of the prior art sling when the direction of pull on the sling is at an angle.

FIG. 5 is a similar diagrammatic view showing the sling of the present invention under similar conditions.

FIG. 6 is a side elevation of a modified use of the sling of this invention.

FIG. 7 is a front view of FIG. 6.

DESCRIPTION OF THE PREFERRED EMBODIMENT

As shown somewhat diagrammatically in FIG. 1, a crane-type helicopter 10 has the usual forward pilots' compartment 12, elongated fuselage 14 and empennage 16. Front and rear landing gear 18 and 20 are provided. Just forward of landing gear 20 a hoist cable 22 depends through the bottom of the fuselage and terminates in a hoist hook 24. This cable can be retracted into the fuselage in a usual manner. A disabled aircraft is shown at 26, herein an airplane, consisting of a fuselage 28 having front and rear landing gear 30 and 32.

The sling assembly of this invention is shown in this figure in place on airplane 26 and connected to hoist cable 22 ready to be transported. This assembly consists essentially of identical forward and aft slings 34 and 36, a spreader bar 38 and a hoist band 40 which is carried by a self-locking, quick-adjusting assembly 42 (FIG. 2) which is engaged by hoist hook 24.

The slings are identical and consequently only one will be described in detail. Each includes a plurality of identical bands. Herein, three bands 44, 46 and 48 are shown although two or more than three could be used if desired. The bands are formed of two layers of material secured together except at the very ends where the layers are separated to form an eye 49 to receive a cylindrical metal thimble through which a pivot pin 50 extends. The bands are secured at their ends to a two-part D-shaped end fitting comprising an arcuate upper part 52 having a curved inner surface 54 and a straight part 56 having bifurcated ends to receive the ends of part 52. Bolts 58 are provided to secure these parts together. Straight part 56 has bifurcations 60 between which the ends of bands 44, 46 and 48 are received and through which the quick-release pivot pins 50 for these bands extend. It will be evident that with this construction the bands are free to swing individually about pins 50.

The spreader bar 38 comprises two telescoping members which are locked in adjusted position by a pin 62. At each end, bar 38 has a bifurcated fitting 64 between the furcations 65 of which the upper curved part 52 of the D-shaped fitting is received. A quick-release pin 66 extends through the furcations 65 and it is on this pin that the curved surface 54 of the D-shaped fitting rests. Quick release pin 66 also pivotally positions a pair of links 68 which lie outside the furcations 65 to the other ends of which hoist band 40 is attached. Hoist band 40 is made up of two layers of material secured together except for an eye formed at its ends to receive a metal thimble similar to that described in connection with the ends of the sling bands 44, 46 and 48. A quick-release pin 70 extends through the free ends of links 68 and through the thimble in hoist band 40, the pin 70 being a shoulder pin which permits the hoist band with its thimble to pivot freely on the pin. The other end of the hoist band is similarly connected to the opposite end of spreader bar 38.

The self-locking, quick-adjusting assembly 42 (FIG. 2) includes an inverted triangular support member 71 which has an eye 72 to receive hook 24 of the hoist cable 22 and a plastic handling ring 74 which is used by the crewman in making the adjustment of assembly 42 to bring the disabled airplane 26 to the correct attitude for flight. The support member 71 has spaced depending sides 73 terminating in its apex between which three drums, or rollers, are mounted on shoulder pins supported in sides 73, one center roller 78 being located at the apex of sides 73 and the other two rollers 80 and 82 being above and spaced to the left and right of the center roller. Hoist band 40 is threaded through these three rollers, passing under the center roller and over the upper rollers.

Connecting straps 84 extend across bands 44, 46 and 48 to prevent them from spreading. These straps, one of which is illustrated in FIG. 5, consist of two strips of webbing material, one in front of and one in back of the bands. These are connected together by lines of stitching 85 at the sides of the bands but are not connected to the bands, so the latter are free to slip through the connecting straps as would be necessary to assume the positions shown in FIG. 5. As many of these connecting straps 84 are used as is deemed necessary, usually four for each sling. The connecting straps have a metal eyelet 86 at each end to receive hooks on the ends of positioning straps 87 which are secured at their other ends to some convenient point on the aircraft as, for example, the landing gear. The positioning straps are used where the configuration of the airplane being transported requires some means of preventing the slings from shifting their positions along the fuselage. Also antichafe pads 88 may be used if required.

In FIGS. 6 and 7 a somewhat modified use of the sling assembly of this invention is shown which is used when the configuration of the disabled aircraft is such that it is not desirable to have the slings converge to a single point at the ends of a single fore and aft spreader bar as shown in FIGS. 1 to 3. Here two spreader bars 38 are used which extend transverse to the longitudinal axis of the fuselage. The ends of the spreader bars are connected to the D-shaped fittings of the slings as in FIGS. 1 to 3, it being noted that the ends of the slings are turned 90° so that quick-release pins 66 occupy the same position relative to these fittings as before. Two hoist band assemblies are required, each including a hoist band 40 and a self-locking, quick-adjusting device 42. The eye 72 of these devices are both engaged by hoist hook 24. Each hoist band 40 has each of its ends attached to a different spreader bar. By adjusting the devices 42 on hoist bands 40 the attitude of the aircraft being transported can be varied as explained in connection with FIGS. 1 to 3.

Positioning straps 87a are provided as well as antichafe pads 88a. Load spreaders 90 may be used if desired to distribute the stresses at the bottom of the fuselage.

In operation, slings 34 and 36 are put in place on the aircraft to be transported as shown in FIG. 1. The spreader bar is attached by means of the quick-release pins 66 and the self-locking, quick-adjusting assembly is then hooked to hoist hook 24 with hoist band 40 in place as shown in this figure. The ends of hoist band 40 are then connected to the ends of links 68 by quick-release pins 70. A crewman makes a tentative adjustment of the slack hoist band 40 by grasping ring 74 and centering the assembly relative to spreader bar 38. The airplane is then lifted sufficiently to determine whether its attitude is acceptable for flight. If it is desired to shift the pickup point, hoist band 40 is slackened by lowering the airplane to the ground and the roller assembly is shifted relative to the band, as required. When the airplane is lifted the roller assembly locks automatically on band 40 in the adjusted position. FIG. 1 shows the roller assembly thus adjusted relative to the hoist band. In this way the lift point, herein hook 24, can be moved fore and aft relative to the c.g. of the airplane to obtain the desired attitude of the latter. In the FIGS. 6 and 7 arrangement of slings and spreader bars this levelling adjustment requires adjusting both of the hoist bands 40.

The advantage of having the slings 34 and 36 made up of three separate bands 44, 46 and 48, each having its ends separately pivoted to the D-shaped fitting 52, is illustrated in FIGS. 4 and 5. With a single wide-band sling 89 formerly used, as shown in FIG. 4, when the upper ends of the sling are moved forward, as in flight, the load is concentrated at a single line 90 at one edge of the band. This not only causes an undesirable concentration of load on the fuselage of the disabled aircraft, but it results in progressive failure across the sling band. By providing a sling having three bands this load is distributed over a greater area of the fuselage and the tendency to cause failure of the sling band by tearing is one third as great as in FIG. 4 because by reason of the engagement of pins 66 with the inner curved surfaces 54 of D-shaped fittings 52 the load is always equally divided among three bands regardless of the angle of pull of hoist sling 40.

I claim:

1. In an aerial recovery system for enabling a helicopter to transport an aircraft, two slings each having a plurality of bands for cradling the aircraft at spaced points along its fuselage, means for equalizing the strain on the several bands including a D-shaped fitting at each end of both slings, means for separately pivotally connecting the bands of each sling in side-by-side relationship to the straight sides of said D-shaped fittings, and a hoist band assembly having a connection to a hoist hook including pins at its ends which extend through said D-shaped fittings and rest on the inner curved surfaces of the curved sides of the latter, said hoist band assembly including a self-locking quick-adjusting device having an eye for attachment of the hoist hook and having a plurality of rollers forming a labyrinth through which the band is threaded for permitting its adjustment along said hoist band when the latter is slack and for automatically locking it in adjusted position when the latter is taut.

2. The aerial recovery system of claim 1, in which the self-locking quick adjusting device includes an inverted U-shaped member having the eye at the top thereof and having the rollers mounted on pins which extend through the parallel depending sides of said member.

3. The aerial recovery system of claim 2 in which the self-locking quick adjusting device has at least one handle which can be readily grasped by a crewman to facilitate adjusting the device on the hoist band.

4. A sling for use in aerial recovery system for enabling a helicopter to transport an aircraft, said sling including a plurality of bands which lie in the same planes, means for equalizing the strain exerted on the several bands by the hoist cable including a D-shaped fitting at each end of said sling, means for separately pivotally connecting the bands of said sling in side-by-side relationship to the straight sides of said D-shaped fittings, the curved sides of said fittings having inner curved surfaces against which the lift forces are exerted, and connecting straps extended across and beyond the bands of the sling terminating in eyelets, said straps including two strips of webbing material, one behind and one in front of the bands of the sling, and means for connecting said strips while permitting said bands to slide individually through said straps.

5. The sling of claim 4, in which the means for connecting the strips includes lines of stitching through said strips which lie between and alongside said bands.

6. The sling of claim 4 in which positioning straps are provided which hook into the eyelets in the connecting straps at one of their ends and are secured at their other ends to aircraft structure.